United States Patent [19]

Saam

[11] Patent Number: 4,808,664

[45] Date of Patent: Feb. 28, 1989

[54] MOISTURE CURABLE POLYISOBUTYLENES

[75] Inventor: John C. Saam, Midland, Mich.

[73] Assignee: Dow Corning Corporation, Midland, Mich.

[21] Appl. No.: 132,449

[22] Filed: Dec. 11, 1987

[51] Int. Cl.$^4$ .............................................. C08F 8/00
[52] U.S. Cl. .................................... 525/106; 525/100
[58] Field of Search ......................................... 525/106

[56] References Cited

U.S. PATENT DOCUMENTS

| | | | |
|---|---|---|---|
| 4,342,849 | 8/1982 | Kennedy | 525/333.7 |
| 4,435,536 | 3/1984 | Kato et al. | 524/378 |
| 4,524,187 | 6/1985 | Greco et al. | 525/332.1 |
| 4,665,127 | 5/1987 | Hirose et al. | 525/106 |
| 4,735,829 | 4/1988 | Hirose et al. | 525/106 |

FOREIGN PATENT DOCUMENTS 2405985 6/1979 France .

OTHER PUBLICATIONS

C. W. Macosko, Polymer Reprint, vol. 26, No. 2, p. 48, 8/85.
Macromolecular Chemistry (p. 1279 of vol. 186 published 1985.)

Primary Examiner—Joseph L. Schofer
Assistant Examiner—Bernard Lipman

Attorney, Agent, or Firm—Robert Spector

[57] ABSTRACT

This invention provides novel moisture curable liquid isobutylene oligomers containing terminal groups of the formula

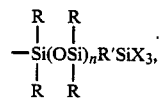

where R represents a monovalent hydrocarbon or halogenated hydrocarbon radical, R' represents an alkylene radical, X is a hydrolyzable group bonded to silicon through oxygen or nitrogen, and n represents an integer from 1 to 5, inclusive. The invention also provides a method for preparing these oligomers by the hydrosilation of terminally unsaturated isobutylene oligomers with a siloxane of the general formula

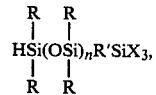

in the presence of a platinum-containing hydrosilation catalyst.

10 Claims, No Drawings

MOISTURE CURABLE POLYISOBUTYLENES

BACKGROUND OF THE INVENTION

1. Field of the Invention

This invention relates to moisture curable polyisobutylenes. More particularly, this invention relates to moisture curable organosiloxy-terminated isobutylene oligomers wherein the terminal positions of the molecules are occupied by a silicon atom bonded to three hydrolyzable groups. The polymers combine the excellent barrier properties of polyisobutylene with the curing properties of moisture curable silicone elastomer compositions.

2. Description of the Prior Art

The class of organic rubbers referred to as "butyl rubber" is superior to other organic rubbers and many silicone rubbers because of its low permeability to gases, including water vapor, high coefficient of friction and resistance to hydrolytic degradation. Butyl rubbers are copolymers wherein about 98 mole percent of the repeating units are derived from isobutylene and the remaining repeating units are derived from isoprene.

Commercially available butyl rubber is typically in the form of a high viscosity gum that is cured by reacting it with organic peroxides or sulfur in the presence of heat. The consistency of the curable compositions and the requirement for heating to achieve curing makes it impractical to utilize the excellent barrier properties of cured butyl rubber in the form of films or coatings exhibiting thicknesses of less than 1 mm.

U.S. Pat. No. 4,342,849, which issued to Kennedy on Aug. 3. 1982 discloses the preparation of telechelic or terminally functional linear polyisobutylenes exhibiting molecular weights of from 500 to 50,000. The lower molecular weight polymers are liquids at 25° C. One class of polymers described in this patent contain carbon-to-carbon double bonds at the terminal positions. The inventor suggests that these polymers can be hydrosilylated to yield "a great variety of other products", but does not disclose a method or suitable organosilicon compounds for carrying out the hydrosilylation.

Curing of liquid isobutylene oligomers by reacting them with organohydrogensiloxanes is reported in an article by the present inventor and C. W. Macosko that appeared in Polymer Preprints (volume 26, no. 2, page 48). published during August of 1985. Oligomers containing from 18 to 20 repeating units per molecule were reacted with either

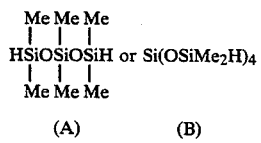

(A)          (B)

at elevated temperatures in the presence of cis-$(Et_2S)_2PtCl_2$ as a hydrosilation catalyst. In these formulae Me represents methyl and Et represents ethyl. The reaction product with A was a clear polymer that dissolved in organic solvents, while the reaction product with B was a gel or a dry elastomer, both of which did not dissolve in organic solvents. In each instance nuclear magnetic resonance data indicated formation of both the expected hydrosilation reaction product and substantial amounts of undesired gaseous by-products that were postulated to be silanes.

It is also known to react organic polymers containing at least two sites of ethylenic unsaturation per molecule with organosilicon compounds containing a silicon-bonded hydrogen atom and at least two hydrolyzable groups such as alkoxy or carboxyl. The resultant products cure at room temperature in the presence of atmospheric moisture.

U.S. Pat. No. 4,435,536, which issued to Kato et al. on Mar. 6, 1984 teaches reacting an organic resin containing pendant and/or terminal vinyl radicals with a silane wherein the silicon atom is bonded to a hydrogen atom and at least one alkoxy group. The resultant resin is curable in the presence of moisture. The types of vinyl resins that can be modified in this manner include styrene and alpha-methylstyrene. The organosilicon compounds disclosed as being useful for reacting with these organic resins are silanes containing a silicon-bonded hydrogen atom and at least two hydrolyzable groups such as alkoxy that are bonded to the silicon atom by means of an oxygen or a nitrogen atom.

In an article appearing in Macromolecular Chemistry (page 1279 of volume 186. published in 1985) Yamashita and coworkers report the synthesis and curing of high molecular weight alkoxysilyl functional butyl rubbers. The curable material was prepared by the reaction of aminopropyltriethoxysilane with commercially available halogenated butyl rubber that had previously been reacted to incorporate a secondary amine or an amine hydrohalide salt structure at the crosslink sites. Complete curing of this material could be achieved only by direct contact with liquid water at a temperature of 70° C. for at least 24 hours. The high viscosity of this composition and the requirement for heating it in contact with liquid water to achieve curing make the composition unsuitable for use as a room temperature vulcanizable composition.

It would be desirable to eliminate both undesirable side reactions during preparation of a curable liquid polyisobutylene and the heating required to achieve curing of prior art alkoxysilyl functional polymers by providing a liquid polyisobutylene containing terminal units of the formula $—SiX_3$ where X represents a hydrolyzable group such as alkoxy or acyloxy.

U.S. Pat. No. 4,524,187, which issued to Greco et al. on June 18, 1985 discloses reacting isobutylene/triene copolymers containing pendant vinyl radicals with a silicon hydride of the general formula $HSiR_aX_{3-a}$. where R represents a monovalent hydrocarbon radical containing from 1 to 10 carbon atoms, X represents a halogen atom or a hydrolyzable group such as alkoxy, phenoxy, acyloxy, amino, aminoxy or oxime and the value of a is 1, 2 or 3. The reaction products, some of which are liquid at 25° C., cure in the presence of atmospheric moisture due to the presence of the hydrolyzable X groups bonded to the silicon atoms.

The only silicon hydride exemplified in the aforementioned Greco et al. patent is trichlorosilane. The hydrosilation reaction product of this compound with a isobutylene/triene copolymer contains silicon-bonded halogen atoms. This reaction product is unsuitable for use as a room temperature vulcanizable composition because of the toxic and highly corrosive hydrogen chloride generated as a by-product of the curing reaction. Room temperature vulcanizable organosiloxane compositions typically contain alkoxy, acetoxy or ketoximo groups as the silicon-bonded hydrolyzable group. These groups produce considerably less objectionable by-products during curing of the polymer.

Attempts by the present inventor to introduce trialkoxysilyl groups into a linear liquid polyisobutylene containing a CH=C(CH₃)- radical at each of the two terminal positions by reacting the polymer with triethoxysilane, HSi(OC₂H₅)₃, in the presence of a platinum-containing hydrosilation catalyst were unsuccessful. This silane is disclosed in the aforementioned U.S. Pat. No. 4,435,536 as a suitable reactant for introducing trialkoxysilyl groups into organic polymers containing ethylenically unsaturated hydrocarbon radicals.

SUMMARY OF THE INVENTION

The present inventor investigated silanes and organosiloxanes containing silicon-bonded hydrolyzable groups other than halogen atoms with the aim of finding one that would react with liquid isobutylene oligomers, and unexpectedly discovered that one particular class of organosilicon compounds is unique in this respect.

An objective of this invention is to provide a novel class of room temperature curable liquid isobutylene oligomers containing a plurality of silicon-bonded alkoxy or other hydrolyzable groups at the terminal positions of the molecule. A second objective is to provide a method for preparing a preferred class of these moisture curable oligomers.

DETAILED DESCRIPTION OF THE INVENTION

This invention provides a moisture curable composition comprising an organosiloxy-terminated isobutylene oligomer exhibiting a number average molecular weight of from 1,000 to 100,000, wherein the terminal units of said oligomer are

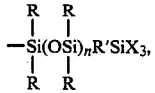

at least 95 percent of the non-terminal repeating units of said oligomer are

—C(CH₃)₂CH₂—, any remaining repeating units other than the residue of the initiator-chain transfer agent used to prepare the isobutylene oligomer are derived from ethylenically unsaturated hydrocarbons that are copolymerizable with isobutylene. the R substituents represent identical or different monovalent hydrocarbon radicals or halogenated monovalent hydrocarbon radicals. R represents an alkylene radical containing from 2 to 10 carbon atoms, X represents a hydrolyzable group that is bonded to silicon by means of an oxygen atom or a nitrogen atom, and n represents an integer from 1 to 5, inclusive.

This invention also provides a method for preparing the moisture curable organosiloxy-terminated isobutylene oligomer described in the preceding paragraph by reacting a telechelic isobutylene oligomer exhibiting a number average molecular weight of from 1,000 to 100,000 and containing a CH₂=CR″-radical at each of the terminal positions with at least a stoichiometric amount of an organosilicon compound of the formula

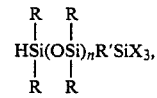

where R, R', X and n are defined hereinabove and R″ represents a hydrogen atom or a methyl radical, in the presence of a catalytically effective amount of a platinum-group metal or a compound of said metal as a hydrosilation catalyst.

At least 95 percent of the non-terminal repeating units of said oligomer are

—C(CH₃)₂CH₂— and any remaining repeating units other than the residue of any initiator-chain transfer agent used to prepare the polymer are derived from ethylenically unsaturated hydrocarbons that are copolymerizable with isobutylene. The characterizing feature of the present moisture curable isobutylene polymers is the nature of the terminal organosiloxane group responsible for the ability of the oligomers to cure under ambient conditions of temperature and humidity. This group exhibits the formula

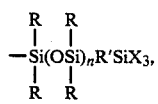

where R, R, X and n are defined hereinabove. This group is the residue remaining following removal of the silicon-bonded hydrogen atom from the organosilicon compound that is reacted with a terminally unsaturated isobutylene oligomer to form the present moisture curable isobutylene oligomers.

In the foregoing Formula I the substituent represented by R is a monovalent hydrocarbon radical or a halogenated monovalent hydrocarbon radical that is free of ethylenic unsaturation. Typically these monovalent hydrocarbon and halogenated hydrocarbon radicals contain from 1 to about 20 carbon atoms. Representative hydrocarbon radicals include but are not limited to methyl, ethyl, the isomeric butyl radicals, octyl, dodecyl, cyclohexyl and phenyl. The halogenated hydrocarbon radicals represented by R include but are not limited to chloromethyl, chloropropyl, and 3,3,3-trifluoropropyl. R is preferably lower alkyl, phenyl or 3,3,3-trifluoropropyl, based on the availability of the reactants used to prepare the organosilicon compounds of Formula I. Most preferably R is methyl. based on the greater reactivity of the corresponding organosilicone compounds with terminally unsaturated isobutylene oligomers.

R' represents an alkylene radical that can contain from 2 to 10 carbon atoms and is preferably ethylene or propylene, based on the availability of the intermediates used to prepare the organosilicon compound corresponding to Formula I.

The hydrolyzable group represented by X is bonded to silicon by means of an oxygen or a nitrogen atom, and includes those groups present on the organosilicon compounds typically used as curing agents in room temperature vulcanizable organosiloxane compositions. These groups include alkoxy, acyloxy such as acetoxy, amino, amido and ketoximino. X is preferably alkoxy containing from 1 to 5 carbon atoms. based on the lower cost of the compounds and the relatively innocuous by-product of the curing reaction, with methoxy and ethoxy being most preferred.

Organosilicon compounds represented by Formula I can be prepared by reacting in the absence of atmospheric moisture substantially equimolar amounts of (1) a silane containing three of the hydrolyzable groups represented by X and a silicon-bonded ethylenically unsaturated hydrocarbon radical and (2) at least one siloxane of the formula

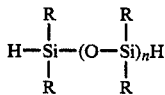

in the presence of a platinum-containing hydrosilation catalyst. Preferred catalysts include complexes of hexachloroplatinic acid with vinyl-containing organosiloxanes. This reaction typically yields a mixture of products that can be separated by distillation to obtain the desired organosilicon compound.

A typical preparative method comprises reacting under an inert, dry atmosphere a mixture of the silane, siloxane and a platinum-containing hydrosilation catalyst at a temperature of from 25 to about 100° C. for from one to twelve hours. The reaction usually produces a mixture of products that includes a compound corresponding to Formula I in yields of from about 50 up to 70 percent or higher. This compound is readily separated from the product mixture by a distillation that is preferably conducted under reduced pressure.

In accordance with a particularly preferred embodiment of this invention the ethylenically unsaturated hydrocarbon radical present on the silane reactant is vinyl or allyl, the hydrolyzable group represented by X is methoxy or ethoxy and the siloxane reactant is sym-tetramethyldisiloxane or symtetraethyldisiloxane. The reaction used to prepare the siloxane typically yields a mixture of compounds wherein n of the foregoing formula is from 1 to 5, inclusive. These mixtures can be purified to yield a single siloxane, or the mixture of siloxanes can be used without further purification.

Room temperature vulcanizable polyisobutylenes of this invention are prepared by reacting a terminally unsaturated isobutylene oligomer with at least a stoichiometric amount of an organosilicon compound corresponding to Formula I in the absence of atmospheric moisture and in the presence of a platinum-containing hydrosilation catalyst. For the purposes of this invention, a "stoichimetric amount" is 2 moles of organosilicon compound for each mole of isobutylene oligomer. It will be understood that a mixture of 2 or more compounds corresponding to Formula 1 can be used. The reaction is typically conducted under a dry, inert atmosphere such as nitrogen.

Suitable isobutylene oligomers exhibit number average molecular weights of from 1,000 to 100,000. This range is preferably from 1,000 to 3,000, based on the ease of reacting these oligomers to form the moisture curable compositions of this invention. The preparation of isobutylene oligomers is described in U.S. Pat. No. 4,342,849, which issued to Joseph P. Kennedy on Aug. 3, 1982. This patent is incorporated herein in its entirety by reference. In accordance with the teaching of this patent isobutylene is polymerized in the presence of an initiator-transfer agent and a suitable Friedel-Crafts catalyst such as boron trichloride.

The initiator-chain transfer agents, referred to in the aforementioned Kennedy patent as infers, are typically polychlorinated aromatic hydrocarbons such as p-di(2-chloro-2propyl)benzene and 1,4-bis(alpha,alpha-dimethylchloromethyl)benzene. The infers contain from two to six halogen atoms per molecule, each of which provides the initiating site for a polymer chain.

Each of the polymer molecules contains the residue remaining following abstraction of the reactive halogen atoms from the infer molecule. Polymers containing two or three chains of repeating units radiating from the infer residue are useful for preparing moisture curable isobutylene oligomers in accordance with the present invention.

The halogen-terminated isobutylene oligomers obtained from the polymerization reaction are converted to the diolefin used as a reactant in the present method by a dehydrohalogenation reaction achieved by heating the halogen-terminated oligomer in the presence of a strong base such as potassium-t-butoxide. The oligomer is typically dissolved in a suitable solvent such as tetrahydrofuran.

Depending upon the method used to prepare the terminally unsaturated isobutylene oligomer the terminal group represented by $CH_2{=}CR''$- can be linked to the isobutylene units by divalent groups that include one or more carbon atoms and/or hetero atoms such as nitrogen, oxygen and sulfur.

The hydrosilation catalyst used to promote the reaction between the terminally unsaturated isobutylene oligomer and at least one organosilicon compound corresponding to Formula I can be platinum, other metals such as rhodium that are members of the platinum group of the Periodic Table of the Elements and compounds of these metals. Halogen-containing platinum compounds such as hexachloroplatinic acid, and particularly reaction products and complexes of these compounds with relatively low molecular weight organic and vinyl-containing organosiloxane compounds are preferred catalysts because of their high activity and compatibility with organosiloxane reactants. A particularly preferred class of catalysts for the reaction of isobutylene oligomers with siloxanes represented by Formula I are mercaptan derivatives of hexachloroplatinic acid, such as $[(C_2H_5)_2S]PtCl_2$.

The platinum containing catalyst can be present in an amount equivalent to as little as one part by weight of platinum per one million parts of reactants. Catalyst concentrations equivalent to from 10 to 1000 parts of platinum per million of reactants are preferred to achieve a practical rate of addition of a siloxane represented by Formula I to the ethylenically unsaturated terminal units of the isobutylene oligomer. Higher concentrations of platinum provide only marginal improvements in the reaction rate, and are therefore economically unattractive, particularly when the preferred catalysts are used.

The reaction between the terminally unsaturated isobutylene oligomer and a compound corresponding to Formula I is preferably conducted in the absence of atmospheric moisture at temperatures of from 50 to 150° C. The reaction mixture can optionally include a diluent that is a solvent for both of the reactants and the catalyst. Diluents may be desirable to reduce the viscosity of the reaction mixture or to moderate an exothermic reaction. A diluent is particularly desirable when the isobutylene oligomer is a solid under ambient conditions.

Suitable diluents for the reaction are liquid hydrocarbons boiling between 80 and 150° C. under atmospheric pressure. Typical diluents include n-heptane, toluene and xylene. The diluent can constitute from 1 up to about 95 weight percent of the reaction mixture.

The time required to achieve a substantially complete reaction ranges from about several hours to several days, depending upon a number of factors that include the type and concentration of reactants and the temperature at which the reaction is conducted. The course of the reaction can be followed using proton nuclear magnetic resonance and observing the disappearance of the maxima resulting from the presence of ethylenic unsaturation (typically at 4.7 and 4.9 ppm) and silicon-bonded hydrogen atoms at 4.8 ppm. The maximum at 7.2 ppm corresponding to hydrogens bonded to an aromatic hydrocarbon structure present in the initiator residue remaining in the isobutylene oligomer can be used as an internal standard.

The product from the reaction of a liquid, terminally unsaturated isobutylene oligomer with at least one organosilicone compound corresponding to Formula I can be used without further purification to prepare cured elastomeric films by coating the reaction product on a substrate and exposing the resultant film to atmospheric moisture at room temperature.

It is apparently not feasible to cure films or other shaped articles greater than about 50 micrometers in thickness because the excellent vapor barrier properties of polyisobutylene prevent both the penetration of water vapor below the surface layer of the film and escape of the volatile alcohol, carboxylic acid or other by-product of the curing reaction. It will be understood that the type of by-product produced depends upon the chemical nature of the group represented by X.

The curable compositions of this invention typically include one of the known catalysts for the hydrolysis and condensation of moisture-curable organosilicon compositions. The specific catalyst selected will depend upon the type of hydrolyzable X group bonded to silicon.

Suitable catalysts for the hydrolysis/condensation of alkoxysilanes include strong acids such as the sulfonic acids, tin compounds such as stannous octoate, organotin compounds such as dibutyltin dilaurate, titanium compounds such as tetraorganotitanates and chelated titanium compounds such as 1,3propanedioxytitanium bis(ethylacetoacetate), carboxylic salts of heavy metals such as lead, antimony, bismuth and zinc and quaternary ammonium compounds such as benzyltrimethylammonium acetate. The tetraorganotitanates and organotin compounds such as dibutyltin dilaurate are preferred catalysts for curing the present compositions.

Catalysts for promoting the hydrolysis/condensation of curable compositions containing hydrolyzable groups other than alkoxy that can be represented by X will be apparent to those skilled in the art, and do not form part of the present invention.

The time required for the present isobutylene compositions to cure ranges from several hours to several days, depending upon ambient temperature, humidity, the reactivity of the X group in the presence of atmospheric moisture and the type of curing catalyst selected.

The present moisture curable compositions are preferably cured in the form of films ranging in thickness from 0.001 to 0.1 mm. by applying a coating of the composition on a suitable substrate. Thicker films can be obtained by including up to about 20 weight percent, based on the weight of the moisture-curable oligomer, of a moisture-transporting agent such as ethyl orthosilicate in the composition to facilitate curing of the interior portion of the film. Because the cured films are typically not self-supporting, it is usually preferable to utilize the excellent vapor barrier properties and adhesion of cured polyisobutylenes by applying the present curable compositions as coatings to substrates that are adversely affected by exposure to oxygen, water vapor or other materials present in the environment of the substrate, so long as these materials will not destroy the integrity of the cured polyisobutylene film.

An alternative method for utilizing the vapor barrier properties of cured isobutylene oligomers is to incorporate the curable compositions of this invention as an additive into compositions containing thermosetting or thermoplastic organic and/or organosilicone polymers. These compositions can be in the form of molding compounds, sealants, potting compounds and compositions for encapsulating electronic devices such as semiconductors and integrated circuits that are adversely affected by moisture. The use of polyisobutylene as an additive in moisture-curable organosiloxane sealant compositions for reducing the permeability of the cured material to gases and vapors is taught in French Pat. No. 2,405,985. The advantage of using the present moisture curable isobutylene oligomers in place of the unmodified oligomers disclosed in the aforementioned French patent is the ability of the former to react and form part of the cured material rather than acting as an unreactive diluent.

The following examples disclose preferred embodiments of the present curable compositions and should not be interpreted as limiting the scope of the invention defined in the accompanying claims either with respect to the compositions or methods for their preparation. Unless otherwise indicated, all parts and percentages are by weight. The calculated molar amounts of polyisobutylene oligomer are based on a number average molecular weight of 1806, Me represents methyl and Et represents ethyl.

The liquid, terminally unsaturated isobutylene oligomers used in the example and the preparation of these oligomers are described in U.S. Pat. No. 4,342,849, which issued to Joseph Kennedy on Aug. 3, 1982.

EXAMPLE 1

A. Preparation of

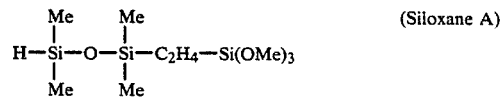 (Siloxane A)

A glass reactor equipped with a water-cooled condenser, thermometer, addition funnel, stirrer and nitrogen inlet was charged with 154.02 g. of 87% pure sym-tetramethyldisiloxane containing as the major impurity

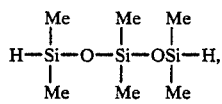

and 1.5 g. of a reaction product of hexachloroplatinic acid and sym-tetramethyldivinyldisiloxane that has been diluted with a liquid dimethylsiloxy terminated polydimethylsiloxane in an amount sufficient to achieve a platinum content of 0.7 weight percent.

The resultant mixture was heated to 80° C., at which time 188.8 g. of 87% pure vinyltrimethoxysilane was added over a period of about one hour. The major impurity in the silane was sym-tetramethoxydivinyldisiloxane. Heating of the reaction mixture at 80° C. was continued for one hour following completion of the silane addition.

Analysis of the product by gas liquid chromatography indicated that it contained 2 moles of the desired "monoaddition product" (Siloxane A),

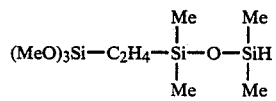

for each mole of the "diaddition" product

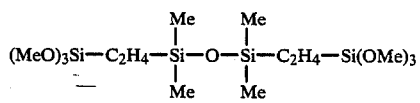

Siloxane A was isolated from the reaction mixture by distillation within the range of from 66 to 77° C. under a pressure of from 1.5 to 2.0 mm. The yield of this product was 41 percent of the value calculated based on amounts of the two reactants.

B. Reaction of a Liquid Isobutylene Oligomer with Siloxane A

A mixture of 19.5 g. (10.8 mmol) of a liquid alpha,omega-di(isobutenyl)polyisobutylene, 6.11 g. (21.6 mmol) of siloxane A and one drop of a 0.1 percent solution of cis($Et_2S)_2PtCl_2$ was heated at 80.5° C. in a sealed reactor for 48 hours. The proton nuclear magnetic resonance spectrum of the reaction product obtained at a frequency of 200 MHz using deuterochloroform as the solvent showed no maxima at 4.9 and 4.7 ppm, which are characteristic of ethylenically unsaturated carbon atoms, or at 4.8 ppm, which is characteristic of silicon-bonded hydrogen atoms. The ratio of protons associated with the methoxy group to the protons associated with silicon-bonded methyl radicals corresponded to the ratio for the expected reaction product, namely

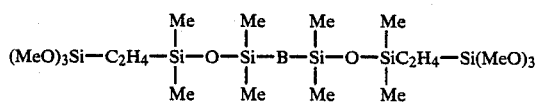

where B represents the initial polyisobutylene.

C. Curing of a Trimethoxysilyl Endblocked Polyisobutylene

A 3.61 g. portion of a reaction product prepared as described in the preceding section B of this example was blended with 0.10 g of tetraisopropyl titanate and poured into an aluminum weighing cup. A thin solid film formed on top of the sample within 30 minutes. The material beneath the film remained liquid for several weeks.

The vapor barrier properties of the cured organosiloxane modified polyisobutylene were determined by covering a layer of water with the polymer. A 3.72 g. portion of a reaction product prepared as described in the preceding section B was dissolved in 12.93 g. of toluene and 0.1 g. of dibutyltin dilaurate was added. An 8.77 g. portion of this solution was carefully poured on top of the surface of a circular water layer weighing 35.4 grams and measuring 9.9 cm. in diameter and about 0.5 cm. in depth. The resultant film was allowed to cure at a temperature of 21.0° C. for 24 hours. during which time the toluene and a small amount of water evaporated. At the end of this time period the cured film completely covered the water layer and was 38±1 micrometers thick.

Seven grams of water evaporated during the initial 24 hour period. and about 0.4 gram evaporated during the next 67 hours. The vapor barrier properties of this film were compared with one prepared in the same manner from a trimethoxy terminated polydimethylsiloxane. The cured polydimethylsiloxane film was 40 micrometers thick, 32.7 grams of water evaporated during the initial 72 hours, and all of the water evaporated after 113 hours. demonstrating the superior barrier properties of the present compositions.

COMPARISON EXAMPLE 1

This Example describes an unsuccessful attempt to prepare a room temperature curable composition by reacting the terminally unsaturated isobutylene oligomer described in the preceding Example 1 with triethoxysilane.

A 4 g. (2.86 mmol) portion of the terminally unsaturated polyisobutylene described in the preceding Example 1 was combined with 0.94 g. (5.71 mmol) of triethoxysilane and 0.05 g. of a 0.1% solution of cis-($Et_2S)_2PtCl_2$, and the resultant mixture was stirred while being heated at a temperature of 80° C. Two drop portions of the reaction mixture were withdrawn periodically and diluted with ten drops of pentane and 1 g. of toluene as an internal standard for the subsequent gas liquid chromatography analysis. At the end of two days of heating the chromatogram indicated that virtually none of the silane had reacted with the polyisobutylene. No curing was observed when this product was combined with dibutyltin diacetate or tetraisopropyl titanate and exposed to ambient conditions of temperature and humidity for several days.

EXAMPLE 2

The procedure described in the preceding Comparative Example 1 was repeated substituting Siloxane A of Example 1 for the triethoxysilane. The following amounts of reactants were combined and heated for six hours at 80° C. with stirring.

| | |
|---|---|
| Unsaturated Isobutylene Oligomer | 14.58 g. (8.1 mmol) |
| Siloxane A | 4.57 g. (16.2 mmol) |
| Toluene (Internal Standard) | 1.0 g. |
| cis-($Et_2S)_2PtCl_2$ (0.1% solution in toluene) | 0.05 g. |

At this time the reaction mixture was analyzed by gas-liquid chromatography and no peak corresponding to Siloxane A was observed, indicating that all of this material had reacted to form a room temperature curable trialkoxysilyl terminated isobutylene oligomer of this invention. A mixture of 3.61 g. of the reaction product and 0.1 g. of tetraisopropyl titanate formed a cured film within one half hour after being exposed to ambient conditions of temperature and humidity.

That which is claimed is

1. A moisture curable composition comprising an organosiloxy-terminated isobutylene oligomer exhibiting a number average molecular weight of from 1,000 to 100,000, wherein the terminal units of said oligomer are $$-\underset{\underset{R}{|}}{\overset{\overset{R}{|}}{Si}}(OSi)_n R'SiX_3,$$

at least 95 percent of the non-terminal repeating units of said oligomer are

—C(CH$_3$)$_2$CH$_2$—, and any remaining repeating units other than the residue of the initiator-chain transfer agent used to polymerize the isobutylene are derived from ethylenically unsaturated hydrocarbons that are copolymerizable with isobutylene, the R substituents represent identical or different monovalent hydrocarbon radicals or halogenated monovalent hydrocarbon radicals, R' represents an alkylene radical containing from 2 to 10 carbon atoms, X represents a hydrolyzable group that is bonded to silicon by means of an oxygen atom or a nitrogen atom and n represents an integer from 1 to 5, inclusive.

2. A composition according to claim 1 where R is lower alkyl, phenyl or 3,3,3-trifluoropropyl, R' is ethylene or propylene, X represents an alkoxy, acyloxy, amino, amido or ketoximo group, n is 1 and all the repeating units of said oligomer are

—C(CH$_3$)$_2$CH$_2$—.

3. A composition according to claim 2 where R is methyl or ethyl, R' is ethylene, X is methoxy or ethoxy and the number average molecular weight of said oligomer is from 1000 to 3000.

4. A composition according to claim 1 where said composition contains a catalyst for the hydrolysis/condensation of said oligomer.

5. A composition according to claim 4 where said catalyst is a tin compound or a titanium compound.

6. A method for preparing a moisture curable organosiloxy-terminated isobutylene oligomer, said method comprising reacting an isobutylene oligomer exhibiting a number average molecular weight of from 1,000 to 100,000 and having a CH$_2$=CR"-radical at each of the two terminal positions with at least a stoichiometric amount of an organosilicon compound of the formula $$HSi(OSi)_n R'SiX_3, \qquad (I)$$

in the absence of atmospheric moisture and the presence of a catalytically effective amount of a platinum-group metal or a compound of said metal as a hydrosilation catalyst, where the R substituents represent identical or different monovalent hydrocarbon radicals or halogenated monovalent hydrocarbon radicals, R' represents an alkylene radical containing from 2 to 10 carbon atoms, R" represents a hydrogen atom or a methyl radical, X represents a hydrolyzable group that is bonded to silicon by means of a nitrogen atom or an oxygen atom, and n represents an integer from 1 to 5, inclusive.

7. A method according to claim 6 where R is lower alkyl, phenyl or 3,3,3-trifluoropropyl, R' is ethylene or propylene, X represents an alkoxy, acyloxy, amino, amido or ketoximo group, n is 1, and all the repeating units of said oligomer are —C(CH$_3$)$_2$CH$_2$—.

8. A method according to claim 7 where R is methyl or ethyl, R' is ethylene, X is methoxy or ethoxy and the number average molecular weight of said oligomer is from 1000 to 3000.

9. A method according to claim 6 where the reaction of said oligomer is conducted at a temperature of from 50 to 150° C. in the presence of a liquid hydrocarbon diluent and said hydrosilation catalyst is selected from complexes of hexachloroplatinic acid with vinyl-containing organosiloxanes and reaction products of hexachloroplatinic acid with low molecular weight organic compounds.

10. A method according to claim 9 where said hydrosilation catalyst is a mercaptan derivative of hexachloroplatinic acid.

* * * * *